July 7, 1970　　　　　　C. V. MOREY　　　　　　3,519,883
FREQUENCY-RESPONSIVE CONTROL APPARATUS IN
ELECTRIC POWER SUPPLY SYSTEMS
Filed Nov. 20, 1967　　　　　　　　　　　　　2 Sheets-Sheet 2
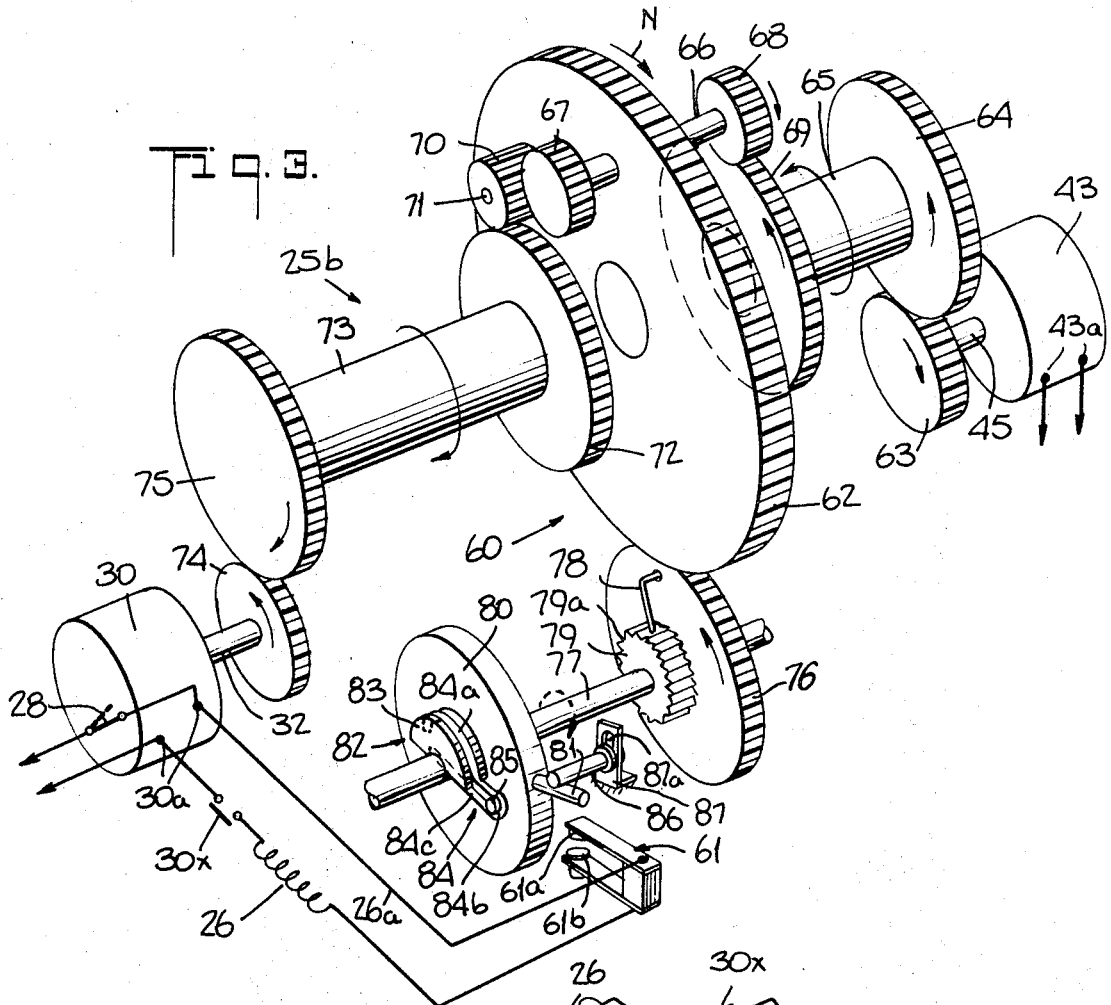
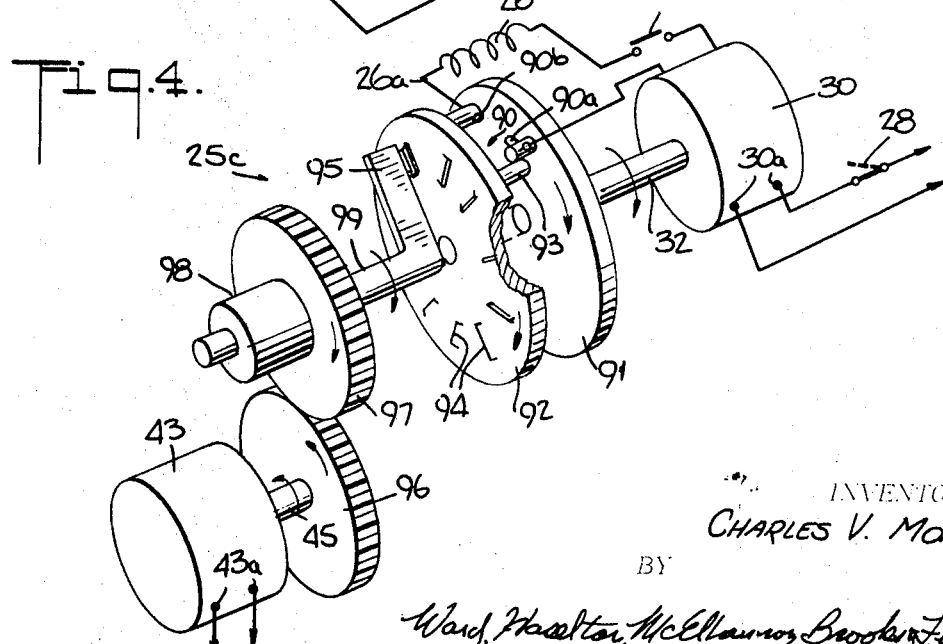
INVENTOR.
CHARLES V. MOREY
BY
ATTORNEYS

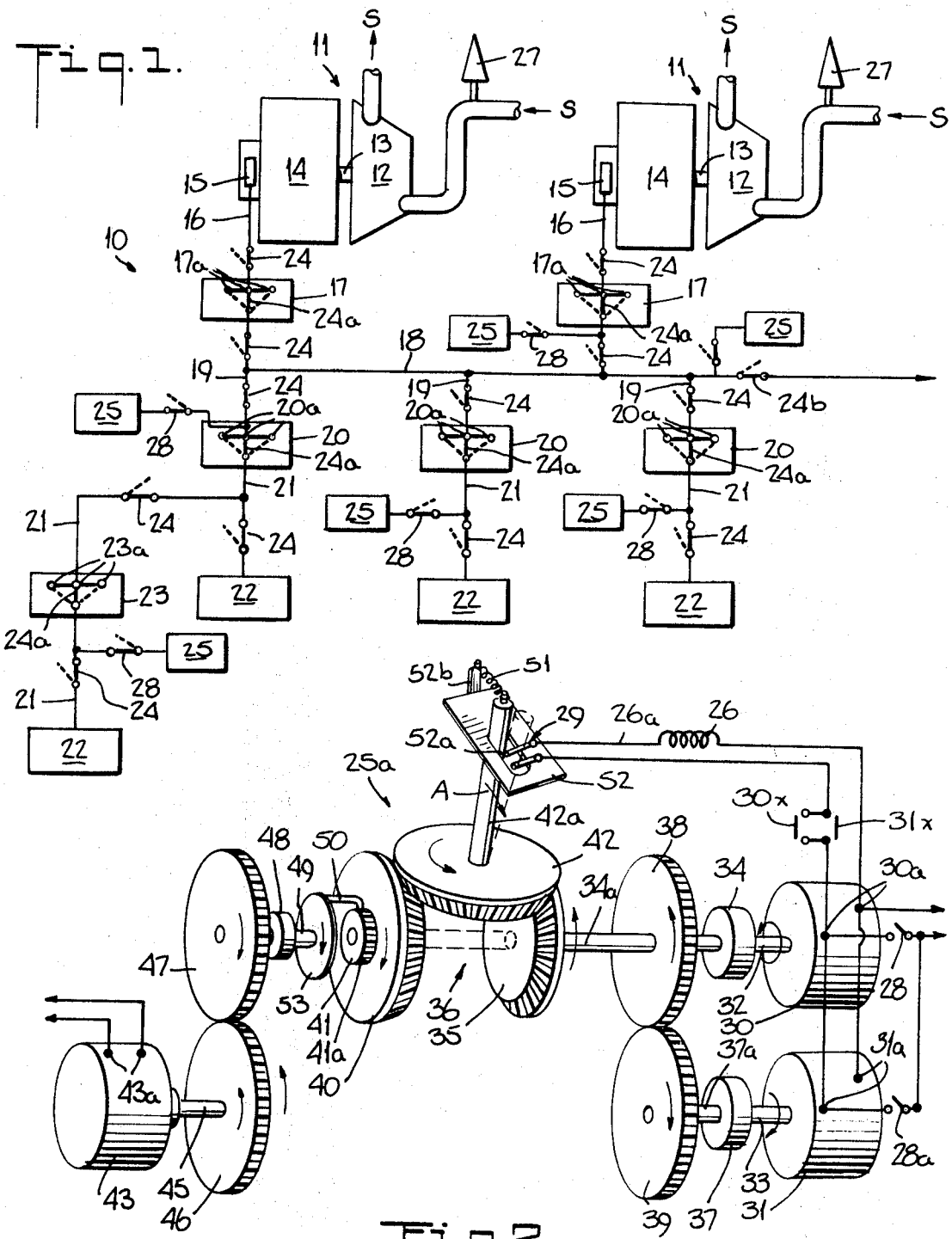

United States Patent Office 3,519,883
Patented July 7, 1970

3,519,883
FREQUENCY-RESPONSIVE CONTROL APPARATUS IN ELECTRIC POWER SUPPLY SYSTEMS
Charles V. Morey, Lynbrook, N.Y., assignor to Consolidated Edison Company of New York, Inc., New York, N.Y., a corporation of New York
Filed Nov. 20, 1967, Ser. No. 684,419
Int. Cl. H02h 7/22, 7/28; H02p 5/48
U.S. Cl. 317—26    24 Claims

ABSTRACT OF THE DISCLOSURE

Method and mechanical apparatus for operating a protective relay in a power system. Synchronous motor continuously drives mechanical mechanism at speed proportional to system frequency; mechanism continuously compares speed of synchronous motor with that of constant speed motor representative of under-frequency limit, constant speed motor being driven independently of system frequency; drop in speed of synchronous motor, due to drop in system frequency, permits constant speed motor to control said mechanism to produce differential movement for closing switch to energize operating coil circuit. See specification for alternative embodiments of said mechanism and control apparatus arrangements, and "fail-safe" features incorporated in arrangements.

---

This invention relates to techniques for controlling electric power generation and distribution systems and, more particularly, to control techniques which are responsive to a change of frequency.

Although the invention may have other uses, it was made during an attempt to devise means to protect an alternating current electric power system under a suddenly imposed, temporary insufficiency in generation as compared with system power demand, and will therefore be described in connection with such use.

It is known that if a load is suddenly imposed upon a power system, or if a portion of system generation capability is suddenly removed, a drop in line frequency of the system will occur. It is proposed to utilize this characteristic frequency drop to operate a protective relay or the like to maintain electric equilibrium in the system at such times when generation is temporarily insufficient to meet power demand. Thus, the invention in its preferred form contemplates an under-frequency responsive control in the system.

In a conventional power system, a plurality of alternating current generators deliver their electric output to a common, or "bus" line. Each generator unit is driven by a steam or water turbine which has a governor for regulating its speed to keep the speed of the generator substantially constant at all times, despite fluctuating line power requirements which tend to change the speed of the generator. As system power requirements are reduced the normal tendency of each generator to increase its speed is counteracted by conventional means which promptly cause partial closing of the turbine governor to thus maintain constant generator speed. However, upon sudden increase in electric power demand, as by sudden imposition of load or by sudden reduction in system generation upon unexpected failure of a generator or similar occurrence, the turbine governors may automatically move to their full-open positions in attempting to counteract the normal tendency of the generators to reduce speed, yet generator speed cannot be maintained constant, as it must be to properly furnish the increased power which is being demanded from the generators. Under these conditions, the possibility for failure of the entire power system is manifest, and it is sometimes necessary to momentarily reduce either line voltage or line power requirements, or both, until the generators can adequately respond to such demand for increased power.

Line voltage is conventionally reduced for the purpose by a change of transformer taps, and line power requirements are conventionally reduced by tripping circuit breakers to temporarily disconnect load such as non-essential and sometimes even essential sub-distribution systems. The present invention provides a frequency-responsive protective relay or controller for promptly and automatically energizing the operating coil or coils of the relays which actuate the desired transformer tap-change devices or circuit breakers which must be actuated in order to bring about either a reduction in line voltage or a cutout of such power absorbing units upon occurrence of such abnormally high imbalance between power demand and supply.

However, it will be apparent that such frequency-responsive apparatus can be used for other purposes, such as for the actuation of a recorder mechanism simply to record the time of occurrence and magnitude of such abnormally high variations in system frequency, or to respond to overfrequency in application where such may be desired, although such other purposes and applications are not further described herein.

When used for the purpose herein described, the controller is intended to be responsive only to a drop of predetermined magnitude in system frequency, such that it will not be responsive to what is considered normal frequency variations in the system. To that end, the apparatus incorporates means for its adjustment to respond at any desired under-frequency.

It is further intended to provide so-called "fail-safe" features in connection with the controller apparatus such that a breakdown in its own operation will not trigger an unwanted or false response in the power system.

It is also intended that the frequency-responsive control apparatus will be completely dependable in operation and, to this end, the controller is mechanical in nature such that its own failure is unlikely to occur.

It is known that the speed of a synchronous motor is at all times directly proportional to the frequency of its power supply, so that the speed of the motor is a reliable and prompt indicator of a change in system frequency. Accordingly, the preferred embodiment of the invention contemplates incorporation of a synchronous speed motor as an indicator of line frequency change, the synchronous motor being powered by connection to any line in the system being controlled.

Briefly and generally describing the invention, a mechanical speed comparison mechanism is interposed between the output shaft of a synchronous motor which is powered by the system being controlled, and the output shaft of a constant speed motor powered independently of system frequency. The synchronous motor drives one rotatable element of the speed comparison mechanism at speed which is at all times proportional to system frequency. The constant speed motor drives a ratchet mechanism at fixed speed corresponding to a preselected under-frequency at which it is desired that corrective action be taken to counteract any temporary inability of normal system controls to maintain system equilibrium in the face of suddenly imposed imbalance between system power supply and demand. Mechanical reaction or output from the controller is not realized under normal conditions when system frequency is above the predetermined under-frequency represented by the speed of the constant speed motor. However, a drop in the speed of the synchronous motor to a speed less than that of the constant speed motor, as is directely indicative of excessive drop in system frequency, causes engagement of the referred to ratchet mechanism with a second rotatable element of the speed comparison mechanism so that the constant speed motor assumes control of the speed comparison mechanism and provokes a desired switch-actuating mechanical movement. The switch actuating movement is utilized to close a switch in an electric circuit which includes the operating coil or coils of any auxiliary relays whose actuation will cause a desired operation of transformer tap changers, circuit breakers or combinations of such devices for temporarily reducing either line voltage or line power demand, or both. Response by the controller can be within a relatively few cycles of frequency, although it can be adjusted or modified to incorporate greater or less time delay of response. When system frequency returns to normal, such indicating restoration of system equilibrium, the attendant increase in the speed of the synchronous motor causes it to again assume control of the speed comparison mechanism so that the referred to operating coil circuit switch is opened.

In its preferred embodiments, the speed comparison mechanism is a differential gear train, the drive shaft of the synchronous motor being connected to one of the primary gears of the differential, and the drive shaft of the constant speed motor being engageable with, or connected to the other primary gear. As will be described, one arrangement includes a ratchet or similar unidirectional clutch device between the constant speed motor shaft and the differential so that no differential output at all is realized until the desired speed relationship exists between the constant speed and synchronous speed motors. In this arrangement, a friction or similar type of overriding clutch is additionally interposed between the constant speed motor shaft and the ratchet drive device to permit continued rotation of the constant speed motor while maintaining the desired differential output established by the drive through the ratchet. Thus, the referred to operating coil switch is retained in the desired closed position. In another arrangement wherein differential output is continuously realized but is reversed in direction upon the preselected speed relationship being established, the unidirectional drive device is located between the differential gear of the mechanism and the switch which the mechanism is intended to actuate. In such arrangement, the referred to additional overriding clutch is also situated adjacent the switch, the clutch having the same purpose as previously mentioned.

In a third embodiment, the speed comparison mechanism comprises a pair of opposed, rotatable flanges or the like, each member of the pair respectively carrying one of the contacts of the switch to be actuated. One of the rotating flanges is driven by the synchronous motor at speed portional to system frequency, and the other is freely rotatable under normal frequency conditions, being carried along by the drive flange, such that the switch contacts remain open. However, through a ratchet connection the otherwise freely rotatable flange is drivingly engaged by the constant speed motor upon a predetermined reduction in speed of the synchronous motor having occurred. The switch contacts are closed by the resulting relative movement of the flanges, as will be explained.

Certain fail-safe features are provided. To avoid false energizing of the controlled relay operating coil in the event of complete failure of electric power to the synchronous motor, the source of supply of current to the operating coil is the same as that to the synchronous motor. In additon, several alternative circuit arrangements and other means are provided to avoid false energizing of the operating coil in the event of failure of the synchronous motor itself due to cause other than the loss of power to the motor.

These and other objects, features and advantages of the invention will become more fully apparent from the following detailed description of several embodiments thereof, when taken together with the accompanying drawings in which:

FIG. 1 is a diagrammatic illustration of an electric power system incorporating the invention;

FIG. 2 is a perspective and partially diagrammatic showing of a frequency-sensitive protective relay control apparatus in accordance with the invention, the supporting frame structure and housing of the controller being omitted for clarity;

FIG. 3 is a showing similar to FIG. 2 of a modified form of the control apparatus; and FIG. 4 is a similar showing of another modified form of the control apparatus.

Referring to FIG. 1, a conventional alternating current electric power generating and distribution system is indicated by reference numeral 10. The system includes one or more stream driven turbo-generators 11 as the main generating facility. That is, each steam turbine 12 is driven by steam S and, via its drive shaft 13, the turbine drives its associated electric generator 14 to produce electricity at the output terminals 15 for delivery to a main power line 16 in well known manner. For example, in a conventional system the generated power is delivered to the line 16 at 13.8 kv. (kilovolts) and at a frequency of 60 cycles per second. Through appropriate transformers 17 the generator output voltage is stepped up, for example to 138 kv., for long distance delivery via a main feeder or bus line 18 to other high voltage feeder lines 19 which service various step-down transformer bank locations as are indicated by reference numerals 20. From any transformer bank 20 the power at the reduced voltage (for example 27 kv. or lower) is delivered through distribution lines 21 either directly, or through additional transformer substations (not shown), or through distribution transformers 23 (only one of which is shown), to electric loads 22. At such distribution transformers 23, the voltage is further stepped down to, for example, 208 volts. Loads 22 as indicated in FIG. 1 are representative of any power absorbing systems or units such as factories, lighting systems, motors, or any other general electric loads.

Appropriate auxiliary relays 24 for tripping an associated circuit breaker (not shown) are located throughout the system within the respective power lines 16, 18 and 21 to connect or disconnect the respective transformer banks, subdistribution systems, and loads from the line. In FIG. 1, each auxiliary relay 24 is shown in its normally deactuated position, its circuit-breaker tripping position being indicated by dotted lines. It should be noted that each relay 24 includes an operating coil which, when energized, will cause the relay to open a circuit breaker. It should also be noted that such auxiliary relays may be at locations which are remote from the respective circuit breakers which they control, and that the actuation of relays 24 may actually initiate a sequence of relay and other operations which ultimately trip the circuit breaker.

In addition, each transformer bank 17, 20 and 23 is shown as having an auxiliary relay 24a for actuating a transformer tap change circuit (not shown), each relay 24a including a similar operating coil. When its operating coil is energized, the relay 24a actuates the tap changer to effect different voltage take-off from the transformer, as diagrammatically illustrated by only three transformer take-off positions 17a, 20a and 23a on each of the respective transformer 17, 20 and 23, although many more of such take-off positions are usually provided. Thus, the respective voltages in the power lines 18 or 21 may be temporarily reduced for the purpose of counteracting a temporary excessive load condition, as previously described. If the unbalanced condition persists, or concurrently with the aforesaid reduction of line voltage, at least part of the load on the line is disconnected from the system by actuation of one of the circuit breaker auxiliary relays 24. It will be understood that any such concurrent or sequential procedures can be initiated using the controller apparatus of the invention.

The system 10 may also be interconnected to one or more other normally independent power systems (not shown) for the purpose of either receiving power from such other systems or utilizing the system 10 to accommodate peak-power demands on such other systems, in now conventional manner. As is well known, a power demand condition initially occurring in one or more of such interconnected systems could produce intolerable power imbalance in, and consequent failure of the entire system 10 unless such other system is promptly disconnected. Thus, such other power systems are connected to the system 10 via a circuit breaker (not shown) having an auxiliary relay 24b for tripping the breaker when necessary. The relay 24b has an operating coil whose energizing will cause the relay to trip the circuit breaker, in well known manner.

In FIGS. 2-4, the operating coil of any such relay 24, 24a or 24b is generally indicated by reference numeral 26.

The power output of the turbo-generators 11 is responsive to load changes as occur from time to time in the system. Under normal conditions, such response is effected by means (not shown) whereby the respective governors 27 of the turbine units 12 automatically open and close, more or less, to cause appropriate change in the rate of flow of steam S to its turbine 12. Thus, for example, if an electric load 22 is suddenly imposed on the system, the governors 27 on the turbo-generator units are opened wider than they already are, to admit more steam S and thereby maintain the required constant speed of their generators 14 while increasing their power output to accommodate the new power demand. Similarly, where a load 22 is taken off the line, the governors 27 automatically adjust themselves so as to reduce the amount of power being supplied to the system.

In any such power system or interconnected power systems, it is possible that the virtually immediate response of the governors 27 in attempting to accommodate a suddenly imposed substantial increase in power demand on their associated generators may be inadequate to maintain electrical equilibrium in the system during the temporary period of system adjustment. Under such extreme unbalanced supply and demand conditions, it is apparent that damage to, or complete failure of the system 10 may be avoided by promptly and automatically either reducing line voltage to a permissible minimum, or removing sufficient load from the line, or both, to reduce total line power demand. As previously pointed out, a change of any of the transformer tap positions 17a, 20a, 23a can be utilized to reduce line voltage in the system or any feeder or distribution line; the bus line relay 24b may be actuated to isolate the system 10 from any other independent system to which it may be connected; or any one or more of the loads 22 can be removed from the line by operating the appropriate relay or relays 24 to reduce the total load within the system 10 itself.

One or more under-frequency responsive controllers in accordance with the invention, as generally indicated by reference numeral 25 in FIG. 1, are located at strategic locations throughout the system 10 for the purpose of automatically actuating the operating coil or coils 26 of one or more of the relays 24, 24a, 24b as may be required to appropriately counteract, in the manner indicated, such power demand as may be imposed on the system. Each controller 25 immediately senses the accompanying significant drop in line frequency when any such intolerable imbalance between power supply and demand occurs, and responds within a predetermined time interval to automatically actuate any relay operating coil or coils 26 as may be included in its circuit, to achieve the desired compensating response. Although fewer or more controllers 25 may be incorporated in the system, FIG. 1 illustrates six such controllers at various locations. Further, although it may be generally understood from FIG. 1 that any controller 25 controls the relay 24, 24a or 24b to which it is adjacent, it should also be understood that one controller, located anywhere, may serve to control any relay, or more than one relay as may be desired. Each controller 25 is connected to the line via a switch 28.

Referring now to FIG. 2 which illustrates a specific embodiment 25a of the frequency-responsive control apparatus 25, the relay operating coil 26 which the controller is intended to energize will be energized by current from the system 10 upon the closing of a switch 29 in its circuit 26a. The closing of the switch 29 is effectuated by a speed comparison mechanism in manner and at times as will be explained. In FIG. 2, the speed comparison mechanism is a differential gear train, generally indicated by reference numeral 36.

The speed comparison mechanism responds to a variation of predetermined magnitude and direction in the speed of a variable speed means, whose speed is at all times proportional to system frequency, as compared with the speed of a constant speed device whose preselected speed is not affected by a change in system frequency. In FIG. 2 the variable speed means is shown as comprising a pair of identical synchronous motors 30, 31 whose respective electrical input terminals 30a, 31a are connected through respective switches 28, 28a to any of the power feeder or distribution lines 16, 18, 19 or 21 from which line frequency is to be sensed. As is well known, the speed of a synchronous motor varies directly with a change in the frequency of its power supply. The motors 30 and 31 further have respective internally located, centrifugal type switches 30x, 31x which are in the coil circuit 26a and will be closed upon start-up of their respective motors 30, 31. Each centrifugal switch 30x, 31x which is of a conventional type, will remain closed so long as its associated motor continues to rotate, but will open automatically if the motor binds or otherwise stops. Two synchronous motors 30, 31 are included in the arrangement of FIG. 2 for fail-safe purposes as will be explained, although it should be understood that only one such synchronous motor is required for operation of the apparatus 25a.

In all of the illustrated embodiments of the invention, each synchronous motor is a type BC, fractional horsepower, single phase, 120 volt motor which produces 60 r.p.m. of its output shaft at 60 cycles. Although not illustrated, it will be understood that a suitable transformer is required when connecting the 120 volt motor to a line of different voltage.

Referring to the uppermost synchronous motor 30 as shown in FIG. 2, its drive or output shaft 32 is connected in driving relation through a conventional type unidirectional clutch 34 and a shaft 34a to a first primary gear 35 of the differential gear mechanism 36. The output or drive shaft 33 of the lowermost synchronous motor 31 is also connected in identical driving relation to the primary gear 35 via its associated unidirectional clutch 37, clutch-output shaft 37a, and one-to-one ratio gears 8, 39 which are respectively attached to the shafts 34a and 37a. By reason of such inclusion of a pair of synchronous motors, apparatus 25a will continue to operate in the event of failure of either synchronous motor since only one such motor is required for operation. That is, if either of the synchronous motors 30 or 31 ceases to operate, it will be automatically disengaged from its driving relation with the differential primary gear 35 by way of slippage in its associated unidirectional clutch 34 or 37, whereupon the other operating synchronous motor will continue to drive the primary gear 35 as intended.

A second primary gear of the differential 36 is indicated by reference numeral 40, and it will be noted that this gear carries an attached ratchet gear 41 for rotation therewith. The second primary gear 40 and ratchet gear 41 are mounted for freely rotative movement, preferably on an extension of the shaft 34a. (For clarity, such extension of the shaft 34a is illustrated only by dotted lines.) Thus, in normal operation the second primary gear 40 and ratchet gear 41 are driven by the first primary gear 35 via a peripherally mounted differential gear 42 of the differential mechanism 36. The differential gear 42 is mounted for free rotative movement on a shaft 42a by which differential output will be realized. The shaft 42a extends through a slot 52a of a fixed switch plate 52. Considering the respective directions of rotation of the shaft 34a, gear 35, and gear 42 as indicated by the arrows in FIG. 2, it will be understood that the differential gear 42 will not move peripherally around the primary gears 35, 40 under such drive conditions, but will simply rotate in stationary peripheral location with respect to both primary gears 35, 40, any tendency of the shaft 42a to move being restrained by the back of the slot 52a of the switch plate 52 against which the shaft normally rests.

The constant speed means of the apparatus 25a comprises a constant speed motor 43 which, in all of the illustrated embodiments of the invention, is a fractional horsepower, chronometric governed, 24 volt, direct current motor whose speed is finely adjustable (by means not shown) for the purpose of pre-selecting the under-frequency to which the controller will be responsive. Alternatively, the constant speed source may be a motor-wound, spring-driven clock (not illustrated) having an adjustable escapement such that its speed may be adjusted as desired for the same purpose. Thus, the adjustable constant speed source is one which is insensitive to a change of system frequency.

Electrical input to the motor 43, via its input terminals 43a, is from a source (not shown) which does not depend for its operation upon the frequency of the power system 10. By means of gears 46, 47 (which may have other than the illustrated one-to-one ratio) and a friction or other overriding type clutch 48, the output or drive shaft 45 of the motor 43 drives a pawl shaft 49 at a predetermined constant speed. A ratchet pawl 50, which slantingly projects from the periphery of a flange 53 or the like attached for rotation with the shaft 49, provides an effective, unidirectional engagement clutch between the shaft 49 and the second primary gear 40 of the differential mechanism 36.

The constant speed of the motor 43 and the ratio of the gearing 46, 47 is such that the rotative speed of the pawl shaft 49, and thus of the ratchet pawl 50, is normally less than that of the ratchet gear 41 as normally driven by the differential mechanism 36 from the shaft 34a as aforesaid. Thus, and although the ratchet pawl 50 and ratchet gear 41 are rotating in the same direction as indicated by the arrows, under normal load conditions in the power system 10 and consequent normal operation of the controller 25a, the teeth 41a of the faster moving ratchet gear 41 will override the angularly disposed pawl 50 so that there is no driving engagement therebetween. For example, in one preferred embodiment of the invention wherein the synchronous motor shaft speed and therefore the speed of the shaft 34a and of the primary gears 35 and 40 is 60 r.p.m. as aforesaid, the preselected constant speed of the shaft 49 and therefore of the pawl 50 is 59 r.p.m. Thus, the pawl 50 does not normally engage the ratchet gear 41 in driving relation.

Under these circumstances, in the event of an abnormal load condition causing line frequency to drop below 59 cycles, the speed of the primary drive shaft 34a will concurrently drop to below 59 r.p.m., whereupon the tip of the ratchet pawl 50, moving at constant speed of 59 r.p.m., will engage one of the teeth 41a of the ratchet gear 41 in driving relation. Such engagement of the gear 41 causes the second primary gear 40 of the differential mechanism 36 to rotate at 59 r.p.m. whereupon, because the first primary gear 35 is rotating at a speed below 59 r.p.m. corresponding to the reduced line frequency, the differential gear 42 will now be driven by the second primary gear 40 and will move peripherally along the gears 35, 40 away from its aforesaid normal peripheral location. The shaft 42a carried by the differential gear 42, moves correspondingly, as indicated by the arrow A and dotted line showing in FIG. 2, its movement being against the bias of a return spring 51. Such movement of the differential output shaft 42a closes the switch 29 by contacting the same as indicated, thus completing the electric circuit 26a to the operating coil 26 of an appropriate relay 24, 24a or 24b. The friction type overriding clutch 48 permits the motor 43 to continue normal rotation while transmitting the necessary force to the gear 40 to hold the shaft 42a against the switch 29 or that the energizing of the circuit 26a is maintained. Depending upon which relay or relays are thereby actuated, line voltage will be reduced by change of transformer tap location, or a load 22 will be disconnected from the line, or the system 10 will be isolated from another interconnected power system (not illustrated), all as previously described.

Upon closing of the switch 29, the energizing of the coil 26 and therefore the actuation of its associated relay or relays is instantaneous, with consequent instantaneous restoration of electric balance in the system due to the elimination or counteraction of the temporarily excessive power requirement. When line frequency rises to or above 59 cycles in the example being described, synchronous motor speed and therefore the speed of the shaft 34a proportionally and concurrently increases, whereupon the second primary gear 40 of the differential mechanism 36 is again driven by the shaft 34a at a speed greater than that of the ratchet pawl 50 and the ratchet gear 41 again overrides the pawl. The differential gear 42 therefore returns to its normal peripheral location on the gears 35, 40, assisted by the urging of the spring 51 acting on its shaft 42a, so that the switch 29 is opened. Thus, the controller immediately resets itself for subsequent actuation. The spring 51 is illustrated as a coil spring having one end attached to the shaft 42a and its other end attached to a mounting 52b on the switch plate 52, and the switch plate 52 is shown as being slotted, as at 52a, for passage of the differential output shaft 42a therethrough. However, it will be understood that other equivalent arrangements might be employed.

The distance of annular spacing of the teeth 41a of the ratchet gear 41 and the required distance of movement of the differential output shaft 42a and, of course, the rate and extent of line frequency drop, are determinative of the reaction time of the control apparatus 25a. Including the few cycles required for speed reaction of the synchronous motor, the switch 29 can be closed by the controller 25a within about twelve to fifteen cycles of frequency, i.e., within about one-quarter of a second, although such time delay of response may be shortened or lengthened by appropriate changes in such spacing distances, backlash and the like as will be apparent.

Certain "fail-safe" features are incorporated in the apparatus 25a. As previously mentioned, the inclusion of a second synchronous motor 31 provides for continued operation of the apparatus 25a in the event of failure of the primary synchronous motor 30, only one synchronous motor being required for normal operation. In this connection, and although the motors 30, 31 might be arranged in tandem relation on a common shaft, it is preferable that such splitting of the synchronous motor load be by a parallel arrangement of the motors 30, 31 wherein the motors drive independent output shafts, as shown, to provide continued operation in the event of "seizure" of either motor shaft. Thus, practically speaking, apparatus failure will only occur upon failure of both motors 30, 31, as in the case of complete failure of lines power supply. It will be noted that, in the event of such loss of power or other reason for the stoppage of both motors 30, 31, the operating coil 26 cannot be energized upon the closing of the switch 29 as would otherwise occur due to the continued operation of the constant speed motor 43 because the coil circuit 26a will be immediately disconnected from its source of electrical power which is via the centrifugal switches 30x and 31x of the motors which automatically open when their respective motors bind or stop. Further, it will be noted that the operating coil circuit 26a through each motor 30, 31 includes the motor switch 28 or 28a so that either motor may be disconnected for service without affecting normal operation of the controller apparatus. Moreover, the opening of both switches 28, 28a will render the operating coil circuit inoperative to avoid false response of the apparatus. However, should only one of the motors 30 or 31 cease to rotate, only its associated centrifugal limit switch (30x or 31x) will open such that the operating coil 26 can still be energized via its circuit through the other.

The modified form of frequency sensing, or controller apparatus 25b as shown in FIG. 3 incorporates a planetary type differential gear mechanism, generally indicated by reference numeral 60, in a similar arrangement for closing a switch 61 in the circuit 26a to energize a relay operating coil 26 in response to a predetermined reduction in speed of the synchronous motor 30 as compared with the speed of the constant speed source 43 for purposes as previously explained. Although two synchronous motors might be employed for reasons described in connection with the FIG. 2 embodiment, only one synchronous motor 30 is illustrated in FIG. 3, its size and characteristics being as previously described, and its electrical power input terminals 30a being connected to any of the system lines 16, 19 or 21 via a switch 28 as in the FIG. 2 embodiment. The constant speed source 43 is the same as that described in connection with FIG. 2, being either a direct current motor or a motor wound, spring driven clock mechanism, in any case having its power input terminals 43a connected to a power supply as indicated, such that its constant speed is independent of the frequency of the system 10. The speed of the synchronous motor output or drive shaft 32 is at all times proportional to the frequency of the system 10, and the speed of the output or drive shaft 45 of the constant speed motor 43 is adjustable (by means not shown) to correspond with any preselected under-frequency response of the apparatus 25b as may be desired, as in the previously described embodiment. One arrangement of the apparatus 25b as will be described for purposes of illustration is such that the differential gear 62 of the differential mechanism 60 normally rotates in the direction indicated by the arrow N when system frequency is 59.6 cycles or above, and at system frequencies less than 59.6 cycles per second the direction of rotation of the gear 62 will be reversed for the purpose of closing the switch 61 as aforesaid.

With reference to FIG. 3, the pre-selected rotative speed of the constant speed motor shaft 45 is 59.6 r.p.m. and, thus, considering the gear ratio between the gears 63 and 64 which connect it in driving relation with the shaft 65, the speed of the shaft 65 is in fixed, direct proportion to 59.6 r.p.m. At a location spaced radially away from its axis of rotation as shown, the differential gear 62 carries a freely rotatable shaft 66 to which a pair of equally sized pinions 67, 68 are attached for rotation therewith. The shaft 66 is appropriately sleeved through the differential gear 62, and is restrained against axial slidable movement through the gear by conventional means, not shown. As illustrated in FIG. 3, the pinion 68 engages what will be referred to as the second primary gear 69 of the differential mechanism 60, the gear 69 being attached for rotation with the shaft 65. Through a directional change idler gear 70, which is mounted for freely rotative movement on a shaft 71 carried by the differential gear 62 as shown, the other pinion 67 is driven by the first primary gear 72 of the differential mechanism 60. The gear 72 is attached to a shaft 73 which is driven at speed proportional to system frequency by the synchronous motor 30 via the gears 74, 75 which are attached to the respective shafts 32, 73 as shown. Although the linear speed of the pinion 68 would otherwise be that which is reflective of the predetermined under-frequency below which the controller apparatus 25b is intended to respond, under normal conditions wherein the optimum speed of the synchronous motor shaft 32 is 60 r.p.m. corresponding to optimum line frequency of 60 cycles per second, the pinion 68 via the shaft 66 will be driven at a higher speed equal to that of the pinion 67 which is reflective of the normally higher system frequency. The linear velocity of pinion 68 is therefore normally greater than that of the gear 69 with which it is intermeshed and, consequently, the pinion 68 will "walk" around the gear 69 at a rate which is reflective of the difference between normal line frequency and the predetermined under-frequency. Via the shaft 66, such "walking" of the pinion 68 will cause the differential gear 62 to rotate, in the direction of the arrow N as shown, thereby continuously producing a differential output of the apparatus 25b under normal line frequency conditions. The gear arrangement is such that such normal direction of rotation of the differential gear 62 will change as soon as the speed of the synchronous motor shaft 32 is reduced to below 59.6 r.p.m., the same being reflective of a drop in system line frequency to below 59.6 cycles per second as previously described.

Such reversal of direction of the differential gear 62 causes reversal of the normal direction of rotation of a gear 76 which engages gear 62 as shown. The gear 76 is mounted for free rotative movement on a shaft 77, and carries a slanting ratchet pawl 78 which, when the gear 76 is rotating in its normal direction as indicated by the arrow, overrides the teeth 79a of a ratchet gear 79 which is attached to the shaft 77. Upon reversal of the gear 76 responsive to a reversal of the differential gear 62, the ratchet pawl 78 engages one of the teeth 79a of the ratchet gear 79, causing the normally stationary shaft 77 to rotate in the direction of the dotted arrow showing. Such rotation of the shaft 77 causes a cam 80 to rotate in the same direction so that its peripherally projecting cam lug 81 moves downwardly to engage and close the switch 61 to complete the electric circuit 26a and thereby energize the relay operating coil 26 for purposes as previously described.

The cam 80 is connected to the shaft 77 by a friction type overriding clutch arrangement generally indicated by reference numeral 82 so that rotative movement of the cam 80 is discontinued while its lug 81 maintains the switch 61 in closed condition, even though the shaft 77 continues to rotate. As shown in FIG. 3, clutch arrangement 82 is provided by a semi-circular, laterally projecting boss 83 of the cam 80, having an annularly extending groove therein (not numbered) in which is mounted the curved leaf 84a of a wire spring 84. The closed end 84b of the spring 84 is mounted on a laterally projecting lug 85 of the cam 80, and its other leaf 84c is in pressure engagement with the underside of the shaft 77 beneath the cam boss 83. But for the pressure of engagement between the spring leaves 84a and 84c which respectively act upon the cam boss 83 and the shaft 77, the cam 80 would be free to rotate on the shaft 77. Thus, when the cam lug 81 has engaged the switch 61 so that the switch is closed, slippage occurs between the rotating shaft 77 and the spring leaf 84c such that the switch 61 is retained in closed condition without damage to the apparatus.

When line frequency rises to 59.6 cycles such that the speed of the synchronous motor 30 increases correspondingly, the direction of rotation of the differential gear 62 is again reversed, whereupon the gear 76 resumes rotation in normal direction as indicated by the arrow, and the pawl 78 carried by the gear 76 again overrides the ratchet gear 79. The resilient leaves on which the respective switch contacts 61a, 61b are mounted will thereupon spring apart so that the switch is opened against the now freely rotatable cam 80. However, in overriding the ratchet gear 79 there exists a small pressure of engagement between the ratchet pawl 78 and the gear teeth 79a tending to rotate the shaft 77 in direction opposite to the dotted arrow showing such that the cam 80 also rotates in such opposite direction due to the frictional engagement of the spring 84 with the shaft 77 and cam boss 83. A fixed stop 86 is therefore provided to limit the movement of the cam lug 81 in direction away from the switch 61.

Time delay of response of the control apparatus 25b may be adjusted by repositioning the cam lug stop 86 closer to the switch 61 via an adjustable mounting of the stop 86, as by repositioning the stop 86 within a vertical slot 87a of a fixed stanchion 87 as shown. Such adjustment of the stop 86 will shorten or lengthen the required distance of movement of the cam lug 81 in closing the switch 61, thereby decreasing or increasing the time-response of the apparatus as will be understood. Additionally, at least one of the projecting switch contacts 61a of the switch 61 may be adjustable with respect to the extent of its projection towards the opposite switch contact 61b, so that the time of closing of the switch may be either lengthened or shortened as will also be understood.

Of course, other arrangements might be employed to alternately close and open the switch 61 responsive to the movement of the differential gear 62, one such arrangement (not illustrated) providing a pair of 12-toothed cams mounted on the shaft 77 for continuous rotation with the gear 76 which, in such arrangement, is also attached to the shaft 77. The cams normally override respective tripping contacts, which together effectively form a switch in conventional manner, but upon reversal cause tripping of both contacts to complete the required circuit. Such alternatives will be apparent to those having skill in the art.

FIG. 4 shows another alternative frequency responsive control apparatus 25c. The synchronous motor 30 receives power through its terminals 30a via a switch 28 from any of the system distribution lines 16, 19 or 21, and a direct current motor or other constant speed source 43 is powered via its input terminals 43a from a source which is independent of line frequency, as in the other embodiments of such control apparatus. A switch generally indicated by reference numeral 90 forms a part of the electric circuit 26a to the relay operating coil 26. The contacts 90a, 90b of the switch 90 are respectively mounted on opposed rotatable flanges 91 and 92 so that a difference in speed between these flanges is utilized to open or close the switch 90. The flange 91, which carries the switch terminal 90a, is attached to the synchronous motor output shaft 32 for rotation therewith in the direction of the arrow showing. The flange 92 is mounted for free rotative movement, preferably on an extension of the shaft 32 which is indicated only by dotted lines in FIG. 4 for clarity of understanding. The flange 92 has a laterally projecting insulated stop 93 which is circumferentially aligned with, and engaged by the laterally projecting switch contact 90a on the flange 91 under such normal conditions of rotation, and thus the flange 92 normally rotates in the same direction as the flange 91, at the same speed as the flange 91, responsive to the urging of the switch contact 90a against the stop 93. The ratchet teeth 94 on the opposite face of the flange 92 therefore normally override the slower rotating ratchet pawl 95, the ratchet pawl 95 being normally rotated at a speed corresponding to the under-frequency below which the controller apparatus 25c is intended to be actuated for the purpose of closing the switch 90. That is, for example, the output drive shaft 45 of the constant speed motor 43 may be rotating at 59 r.p.m. indicative of an under-frequency of 59 cycles per second, whereupon the ratchet pawl 95 is also rotated at 59 r.p.m. via the one-to-one ratio gears 96, 97 and overriding clutch 98 which drive the shaft 99 to which the pawl 95 is attached.

Should line frequency drop below 59 cycles per second thus causing the speed of the synchronous motor shaft 32 to be reduced below 59 r.p.m., the constantly rotating ratchet pawl 95, rotating at 59 r.p.m., will engage one of the ratchet teeth 94 to drive the flange 92 at 59 r.p.m. Because it is now moving faster than the flange 91, the flange 92 will carry the switch contact 90b into engagement with the slower moving switch contact 90a (with which it is circumferentially aligned as shown), whereupon the switch 90 will be closed and the circuit 26a and hence the operating coil 26, will be energized.

When line frequency has been corrected to 59 cycles or above, the correspondingly increased speed of the synchronous motor 30 causes the flange 91 to again move faster than the speed of the pawl 95, whereupon the switch contact 90a will be moved out of engagement with the switch contact 90b so that the switch 90 is opened, and the coil 26 de-energized. The switch contact 90a will again abut the stop 93 on the flange 92 so that the flange 92 correspondingly increases its speed relative to the pawl 95, and its ratchet teeth 94 will thereupon again override the pawl 95.

It will be understood that all of the referred to fail-safe features of the FIG. 2 embodiment may be incorporated in either of the embodiments illustrated in FIGS. 3 and 4.

I claim:

1. In an alternating current electric power system normally having a predetermined, desired frequency but subject to changes thereof and having operable means to be actuated to change the electrical connections between alternating current carrying portions of said system upon occurrence of an imbalance condition which imposes abnormally high power demand on said system, the improvement comprising frequency responsive control means comprising variable speed means, means connecting said variable speed means to said system for driving said variable speed means at speed which is at all times proportional to system frequency, constant speed means including means for driving the same independently of system frequency at preselected speed different from the speed of the variable speed means at said predetermined frequency and representative of frequency limit of system frequency, speed comparison means for comparing the speeds of said variable speed means and said constant speed means, and means actuated by said speed comparison means for actuating said operable means responsive to a change in speed of said variable speed means from the speed at said predetermined frequency to a speed corresponding to a system frequency farther from said predetermined frequency than said frequency limit.

2. The improvement according to claim 1 wherein said speed comparison means comprises a mechanical differential mechanism connected to said constant speed means by a unidirectional drive permitting said mechanism to operate faster than said constant speed means and connected to said variable speed means so as to be driven thereby.

3. The improvement according to claim 1 wherein said system comprises a pair of circuits, and said operable means comprises an operating coil and means controlled by said coil for changing the connection between said pair of circuits, said means actuated by said speed comparison means comprises an electric circuit including said operating coil of said operable means and a circuit switch, said circuit switch being actuated by said speed comparison means responsive to said change in speed of said variable speed means.

4. In an alternating current electric power system having operable means including an operating coil and to be actuated upon occurrence of an imbalance condition which imposes abnormally high power demand on said system, the improvement comprising under-frequency responsive control means comprising variable speed means, means including switch means connecting said variable speed means to said system for driving said variable speed means at speed which is at all times proportional to system frequency, constant speed means including means for driving the same independently of system frequency at preselected speed representative of an under-frequency limit of system frequency, speed comparison means for comparing the speeds of said variable speed means and said constant speed means, and means actuated by said speed comparison means for actuating said operable means responsive to a change in speed of said variable speed means to a speed corresponding to a system frequency below said under-frequency limit, said means actuated by said speed comparison means comprising an electric circuit including said operating coil of said operable means, said switch means and a circuit switch, said circuit switch being actuated by said speed comparison means responsive to said change in speed of said variable speed means.

5. In an alternating current electric power system having operable means to be actuated upon occurrence of an imbalance condition which imposes abnormally high power demand on said system, the improvement comprising under-frequency responsive control means comprising variable speed means, including two synchronous speed motors having respective drive shafts in parallel arrangement with each other, means connecting said motors to said system for driving said motors at speed which is at all times proportional to system frequency, constant speed means including means for driving the same independently of system frequency at preselected speed representative of an under-frequency limit of system frequency speed comparison means for comparing the speeds of said motors and said constant speed means, means connecting said synchronous speed motor drive shafts in driving relation with said speed comparison means whereby said speed comparison means continues to be driven by one of said synchronous speed motors upon failure of the other, and means actuated by said sped comparison means for actuating said operable means responsive to a change in speed of said motors to a speed corresponding to a system frequency below said under-frequency limit.

6. The impovement according to claim 5 wherein said means connecting said synchonous speed motor drive shafts in driving relation with said speed comparison means comprises unidirectional drive means on each of said synchronous speed motor drive shafts, each said unidirectional drive means being disengageable to disengage its associated synchronous speed motor from its said driving relation with said speed comparison means upon failure of said associated motor.

7. The improvement according to claim 6 wherein said means actuated by said speed comparison means comprises an electric circuit including an operating coil of said operable means and a circuit switch, said circuit switch being actuated by said speed comparison means responsive to said change in speed of either of said synchronous motors, each of said synchronous motors having a speed-responsive switch which is normally open and is closed when its associated motor is operating substantially at its said speed, said electric circuit being electrically connected to said power supply system via both of said speed-responsive switches whereby, upon said actuation of said circuit switch, said electric circuit will be energized provided either of said speed-responsive switches is in its closed position.

8. The improvement according to claim 7 wherein each synchronous speed motor further has a switch connecting the same to said power supply system, said respective switches being electrically arranged whereby each said synchronous speed motor is powered independently of the other, and said circuit may be so energized through either of said switches.

9. The improvement according to claim 1 wherein said speed comparison means comprises a pair of rotatable members, said variable speed means comprises a synchronous speed motor connected for driving one of said pair of rotatable members, said constant speed means comprises a constant speed motor connected for driving the other of said rotatable members, one of said variable and constant speed means being interconnected with its associated rotatable member by a unidirectional drive means permitting said associated rotatable member to rotate in a predetermined direction at a speed different from said one of said speed means, and said means actuated by said speed comparison means comprises an electric circuit including an operating coil of said operable means and a circuit switch, said circuit switch being actuated responsive to predetermined relative movement between said rotatable members.

10. The improvement according to claim 9 wherein said circuit switch comprises a first contact element mounted on one of said rotatable members and a second contact element mounted on the other of said rotatable members.

11. The improvement according to claim 9 wherein said speed comparison means comprises a differential gear train including said one of said rotatable members as a first primary gear and said other of said rotatable members as a second primary gear and a differential gear therebtween, said differential gear being movable in predetermined manner responsive to predetermined relative movement between said first and second primary gears, said circuit switch being actuated responsive to said movement of the differential gear.

12. In an alternating current electric power system having operable means including an operating coil and to be actuated upon occurrence of an imbalance condition which imposes abnormally higher power demand on said system, the improvement comprising under-frequency responsive control means comprising variable speed means, including a synchronous speed motor, means connecting said motor to said system for driving said motor at speed which is at all times proportional to system frequency, constant speed means including a constant speed motor and means for driving the same independently of system frequency at preselected speed representative of an under-frequency limit of system frequency, speed comparison means for comparing the speeds of said motors and said constant speed means, and means actuated by said speed comparison means for actuating said operable means responsive to a change in speed of said synchronous motor to a speed corresponding to a system frequency below said under-frequency limit, said means actuated by said speed comparison means comprising an electric circuit including said operating coil and a circuit switch and said speed comparison means comprising a differential gear train of the planetary type having first and second primary gears and a differential gear therebtween, whereby said differential gear normally rotates in one direction but is rotatable in the opposite direction responsive to predetermined relative movement between said first and second primary gears, and comprising rotatable gear means in driven engagement with said differential gear, rotatable switch actuator means mounted to engage and close said circuit switch and overriding clutch means providing unidirectional driving engagement between said rotatable gear means and said rotatable switch actuator means, whereby the latter is rotated into engagement with said circuit switch when said differential gear rotates in said opposite direction and said gear means continues to rotate while said switch actuator means engages said circuit switch, said synchronous motor and said constant speed motor being connected to drive respectively said first primary gear and said secondary promary gear.

13. Frequency-responsive control apparatus for an alternating current electric power supply, comprising variable speed means for electrical connection to said power supply to be driven thereby, said variable speed means comprising a synchronous speed motor which, when so connected and driven, has a speed which is at all times proportional to the frequency of said power supply, constant speed means to be driven independently of said frequency, and means for comparing the speeds of said variable speed means and said constant speed means comprising a differential gear train including first and second primary gears and a differential gear, said synchronous speed motor being connected to said first primary gear for driving the same, and unidirectional engagement means connecting said constant speed means to said second primary gear whereby said differential gear moves differentially in response to engagement of said unidirectional engagement means.

14. Frequency-responsive control apparatus according to claim 13 wherein said unidirectional engagement means comprises a ratchet and pawl.

15. Frequency-responsive control apparatus according to claim 13 which further comprises switch means, means on said differential gear for engaging said switch means upon said differential movement thereof, and overriding clutch means between said constant speed means and said unidirectional engagement means, said switch means being in fixed position whereby its said engagement by said means on the differential gear limits said differential movement of the latter, said overriding clutch means permitting termination of said differential movement of the differential gear to maintain said engagement of the switch means while permitting continued operation of said constant speed means.

16. Frequency-responsive control apparatus according to claim 15 wherein said switch means comprises switch contact means disposed for engagement by said means on the differential gear, and spring means biasing said means on the differential gear in direction away from its said engagement with said switch contact means.

17. Frequency-responsive control apparatus for an alternating current electric power supply, comprising variable speed means for electrical connection to said power supply to be driven thereby, said variable speed means comprising a synchronous speed motor which, when so connected and driven, has a speed which is at all times proportional to the frequency of said power supply, constant speed means to be driven independently of said frequency, comprising a constant speed motor, and means for comparing the speeds of said variable speed means and said constant speed means comprising a planetary gear train including first and second primary gears and a differential gear, said synchronous speed motor being connected to said first primary gear for driving the same and said constant speed motor being connected to said second primary gear for driving the same, whereby said differential gear normally rotates in one direction and reverses its direction of rotation responsive to a predetermined change of speed of said synchronous motor relative to the speed of said constant speed motor.

18. Frequency-responsive control apparatus according to claim 17 wherein said planetary gear train further comprises a directional change idler gear mounted on said differential gear and meshing with said first primary gear, a pinion shaft rotatably mounted on said differential gear, a first pinion gear attached to said shaft and meshing with said idler gear, and a second pinion gear attached to said shaft and meshing with said second primary gear.

19. Frequency-responsive control apparatus according to claim 18 which further comprises switch means, rotatable switch actuator means for engaging said switch means, rotatable means in driven engagement with said differential gear, and clutch means providing unidirectional driving engagement between said rotatable means and said switch actuator means to rotate the latter into said engagement with said switch means when said differential gear is rotating in said reversed direction and further providing continued but overriding rotative movement of said rotatable means with respect to said switch actuator means when the latter is in said engagement with said switch means.

20. Frequency-responsive control apparatus according to claim 19 wherein said rotatable means and said switch actuator means are rotatably mounted on a common shaft, and said clutch means comprises a ratchet gear attached to said shaft and a ratchet pawl carried by said rotatable means and engaging said ratchet gear to provide said unidirectional driving engagement, and an overriding clutch mechanism providing said continued but overriding rotative movement, said overriding clutch mechanism comprising spring means carried by said switch actuator means and frictionally engaging said shaft.

21. Frequency-responsive control apparatus according to claim 19 wherein said switch means comprises a pair of normally open engageable switch contacts, and said switch actuator means has projecting means for engaging and closing said switch contacts, the distance of movement of said projecting means in engaging and closing said switch contacts being adjustable.

22. Frequency-responsive control apparatus for an alternating current electric power supply, comprising variable speed means for electrical connection to said power supply to be driven thereby, said variable speed means comprising a synchronous speed motor which, when so connected and driven, has speed which is at all times proportional to the frequency of said power supply, constant speed means to be driven independently of said frequency comprising a constant speed motor and means for comparing the speeds of said variable speed means and said constant speed means, comprising first and second rotatable members, said synchronous speed motor being connected to said first rotatable member, an unidirectional drive means connected between said constant speed motor and said second rotatable member for driving the latter, switch means comprising a first switch contact carried by said first rotatable member and a second switch contact carried by said second rotatable member, said first and second switch contacts being positioned in the path of each other for switch closing engagement during relative rotative movement between said first and second rotatable members, said second rotatable member further carrying stop means within said path and in spaced relation with respect to said second switch contact in the direction of driving engagement of said unidirectional drive means, said first switch contact being positioned between said second switch contact and said stop means for respective engagement therewith during opposite relative movement between said first and second rotatable members.

23. Frequency-responsive control apparatus according to claim 22 which further comprises overriding clutch means between said constant speed motor and said second rotatable member, said overriding clutch means permitting termination of relative movement between said rotatable members when said first and second switch contacts are in switch closing engagement with each other while permitting continued engagement of said unidirectional drive means and while further permitting continued operation of said constant speed motor at a speed which would otherwise drive said second rotatable member faster than said first rotatable member.

24. A method for counteracting a temporarily excessive demand for power in a circuit as compared with the power being generated in an alternating current electric power system having a predetermined normal frequency, said system being connected to said circuit by a protective relay which is operable to change the connection therebetween, comprising the steps of continuously and mechanically comparing the speed of a synchronous speed motor with the speed of a constant speed motor, said synchronous speed motor being driven by power from said system whereby its speed is at all times proportional to system frequency, and said constant speed motor being driven independently of system frequency at a constant speed whereby its said speed is representative of a preselected frequency different from said predetermined normal frequency producing a mechanical indication of said comparison when said speed produced by said synchronous speed motor is reduced by a drop in system frequency to a speed, corresponding to a frequency farther from said predetermined frequency than said preselected frequency, and utilizing said mechanical indication to actuate said protective relay in said system to change said connection between said circuit and said system.

References Cited

UNITED STATES PATENTS

| | | | |
|---|---|---|---|
| 578,569 | 3/1897 | Knox | 74—675 X |
| 1,501,264 | 7/1924 | Boddie | 318—76 |
| 3,300,648 | 1/1964 | Rockefeller et al. | 307—86 |

J D MILLER, Primary Examiner

W. H. BEHA, SR., Assistant Examiner

U.S. Cl. X.R.

74—675; 307—86; 318—8, 76